United States Patent [19]

Mizuno et al.

[11] Patent Number: 5,122,998
[45] Date of Patent: Jun. 16, 1992

[54] MAGNETO-OPTICAL RECORDING AND REPRODUCING APPARATUS HAVING MAGNETIC HEAD VERTICALLY MOVING SUPPORT

[75] Inventors: Osamu Mizuno, Osaka; Masanari Mohri; Tohru Nakamura, both of Katano; Noboru Kikuchi, Hirakata, all of Japan

[73] Assignee: Matsushita Electric Industrial Co., Ltd., Osaka, Japan

[21] Appl. No.: 538,558

[22] Filed: Jun. 15, 1990

[30] Foreign Application Priority Data

Jun. 15, 1989 [JP] Japan ................... 1-153377
Jun. 15, 1989 [JP] Japan ................... 1-153383

[51] Int. Cl.⁵ .............................. G11B 13/04
[52] U.S. Cl. ..................... 369/13; 360/114; 360/103; 360/66
[58] Field of Search .......... 369/13, 14; 360/59, 360/114, 103, 66

[56] References Cited

U.S. PATENT DOCUMENTS

| | | | |
|---|---|---|---|
| 4,209,813 | 6/1980 | Bryer | 360/105 |
| 4,639,804 | 1/1987 | Moribe et al. | 360/105 |
| 4,740,937 | 4/1988 | Watanabe | 369/13 |
| 4,853,811 | 8/1989 | Brooks, Jr. et al. | 360/103 |
| 4,984,225 | 1/1991 | Ando | 369/13 |
| 4,993,009 | 2/1991 | Shiho | 369/13 |

FOREIGN PATENT DOCUMENTS

| | | |
|---|---|---|
| 3309865A1 | 9/1983 | Fed. Rep. of Germany . |
| 3410581A1 | 9/1985 | Fed. Rep. of Germany . |
| 60-251541 | 12/1985 | Japan . |
| 63-23262 | 1/1988 | Japan . |
| 63-55704 | 3/1988 | Japan ........................ 360/114 |
| 1-92975 | 4/1989 | Japan . |
| 2192750A | 1/1988 | United Kingdom . |

Primary Examiner—Stuart S. Levy
Assistant Examiner—Hoa Nguyen
Attorney, Agent, or Firm—Wenderoth, Lind & Ponack

[57] ABSTRACT

A magneto-optical recording and/or reproducing apparatus includes an optical head for providing a light spot for recording, reproducing and erasing of a magneto-optical disc, a magnetic head which is disposed at a position opposing the optical head with the magneto-optical disc therebetween and which provides a magnetic field for recording and erasing while maintaining a substantially constant distance from the magneto-optical disc by effecting a lift obtained by an air flow generated by the rotation of the disc, a loadbeam which has the magnetic head on its one end and serves to provide a force caused by elastic deformation to the magnetic head to thereby be balanced with the lift thus obtained, and a moving mechanism connected to the loadbeam. Approaching or evading the magnetic head to or from the magneto-optical disc can be realized by deforming the moving mechanism.

6 Claims, 6 Drawing Sheets

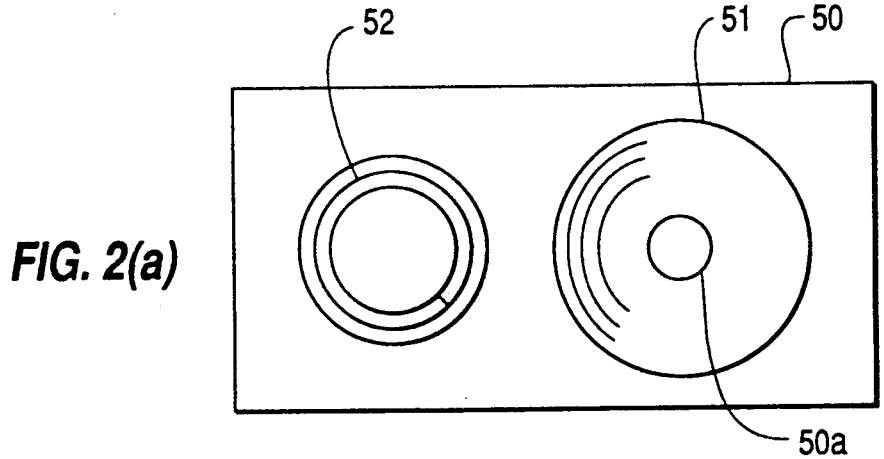
FIG. 2(a)
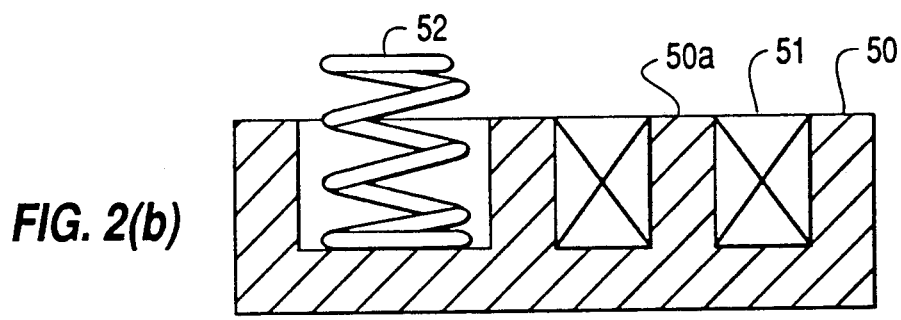
FIG. 2(b)
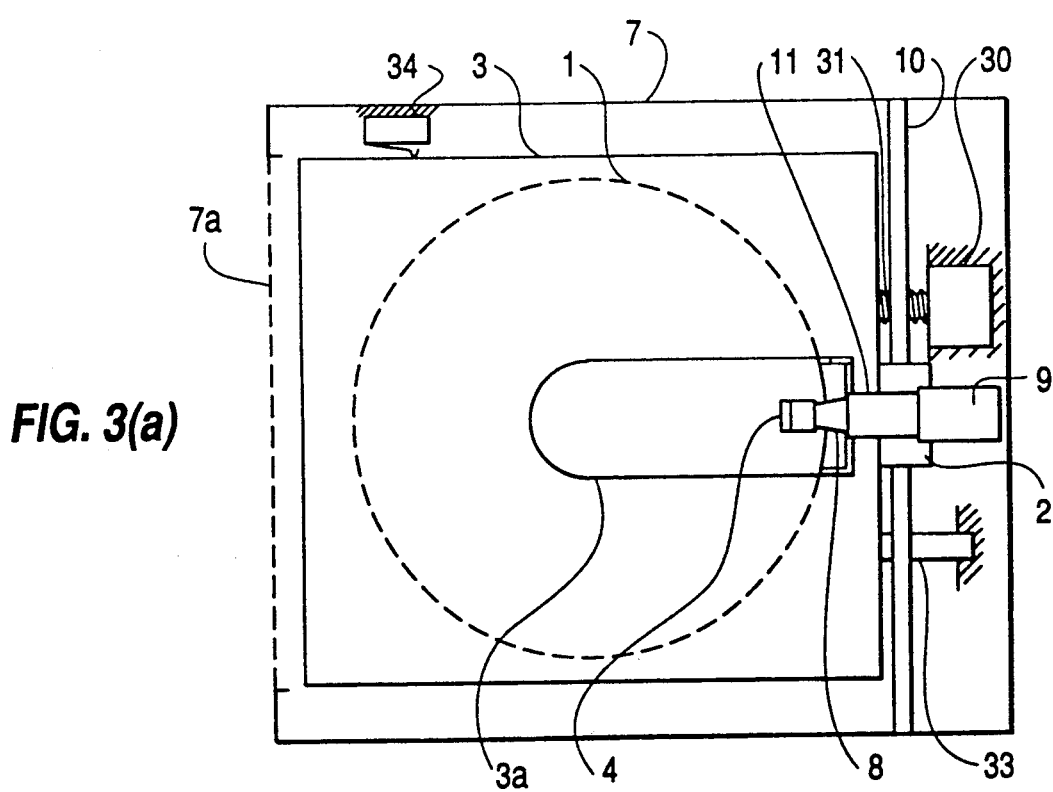
FIG. 3(a)
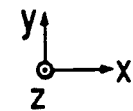

MAGNETO-OPTICAL RECORDING AND REPRODUCING APPARATUS HAVING MAGNETIC HEAD VERTICALLY MOVING SUPPORT

BACKGROUND OF THE INVENTION

1. Field of the Invention

This invention relates to a magneto-optical recording and/or reproducing apparatus for use, for example, in an external storage of a computer or an information recording and/or reproducing apparatus for recording and/or reproducing information such as audio or video signals or the like.

2. Description of the Prior Art

With recent developmental progresses in electronic computation and high speed transmission of a large volume of information, nonvolatile storage having a low cost, high storage density and capacity and high transmission speed has been required. In order to meet these requirements, the magnetic disc apparatus has been widely used. However, problems such as low recording density and high price per information unit have been associated with such apparatus. Further, the reliability is low in the case of the magnetic disc apparatus whose recording medium is exchangeable. Optical recording technology has come into a limelight as a technology capable of solving these problems, particularly, rewritable magneto-optical recording technology is now being observed with a great expectation by many industries.

In the magneto-optical recording technology, it is difficult to carry out over-write by means of the recording procedure based on optical modulation and as a result, an over-write method based on magnetic modulation is under consideration recently. Many reports on this are available. This method resembles the fixed magnetic disc recording method, and the magnetic field to be applied to a magneto-optical disc is modulated by a lift-type magnetic head, and the size of recording bit is controlled by the diameter of a converged laser beam.

In a magneto-optical recording and/or reproducing apparatus, magneto-optical disc as a recording medium is generally exchangeable and contained in a cartridge. When a magneto-optical disc is to be removed from the apparatus for replacement, it is required to be lifted up from the spindle motor and removed from the turntable on which it is mounted. In this case, the magnetic head is required to be lifted up in a direction to be apart from the magneto optical disc. Also, the magnetic head is required to be further lifted up in order to prevent it from colliding with the disc cartridge.

In the conventional exchangeable magnetic disc apparatus, the lifting and lowering of the magnetic head for exchanging a recording medium were carried out by deforming a loadbeam, which is well-known as a load means, for urging the magnetic head to the magnetic disc. However, in the magneto-optical recording and/or reproducing apparatus, the magnetic head is required to be evaded as explained above including the cartridge, so that the magnetic head is required to be moved vertically by as much as several milli-meters for this purpose. As a result, the conventional method of vertically moving the magnetic head by deforming the loadbeam in order to avoid collision with the cartridge can cause the loadbeam spring to exceed its allowable stress, resulting in either permanent strain residual or fatigue fracture. In addition, if the loadbeam is designed sufficiently conservatively and an allowable strain is introduced, traceability of the magnetic head to a magneto-optical disc will be decreased. This tends to cause an accident such as, for example, a crush, resulting in the destruction of data.

SUMMARY OF THE INVENTION

An object of this invention is to provide a magnetooptical recording and/or reproducing apparatus having a means for vertically moving a magnetic head, which is low in cost and superior in reliability.

order to attain the above-mentioned object, a magneto-optical recording and/or reproducing apparatus of this invention comprises an optical head for providing a light spot for the recording, reproducing or erasing of a magneto-optical disc, a magnetic head disposed at a position opposing to the optical head with the magnetooptical disc therebetween for providing a magnetic field for the recording or erasing of the magneto-optical disc while maintaining a substantially constant distance from the magneto-optical disc with the help of a lift caused by an air flow generated by the rotation of the magneto-optical disc, a load means such as, for example, a loadbeam, which has a magnetic head on its one end and serves to provide a force by elastic deformation to the magnetic head thereby to be balanced with the lift thus obtained, a deformation means connected to the load means, and means for approaching and evading the magnetic head to and from the magneto-optical disc by deforming the deformation means.

The invention is so constructed as above that the magnetic head can be approached to and evaded from a magneto-optical disc by means of deforming the deformation means. As a result, the load means such as, for example, the loadbeam does not need to be deformed and a load means for which only traceability to a magneto-optical disc was taken into consideration can be used. Accordingly, the possibility of accidents occurring such as the collision of the magnetic head with the magneto-optical disc can be substantially reduced, largely contributing to the enhancement of the reliability of data and the improvement of the service life of the apparatus.

BRIEF DESCRIPTION OF THE DRAWINGS

FIGS. 1 (c) and (d) are side views of the magnetooptical recording and/or reproducing apparatus shown in FIGS. 1 (a) and (b);

FIG. 2 (a) is a top view of a magnetic yoke according to the first embodiment of this invention;

FIG. 2 (b) is a cross-sectional side view of the magnetic yoke shown in FIG. 2 (a);

FIGS. 3 (b) and (c) are side views of the magnetooptical recording and/or reproducing apparatus shown in FIG. 3 (a);

FIGS. 4 (b) and (c) are side views of the magnetooptical recording and/or reproducing apparatus shown in FIG. 4 (a).

DESCRIPTION OF THE PREFERRED EMBODIMENTS

Figure 1A:
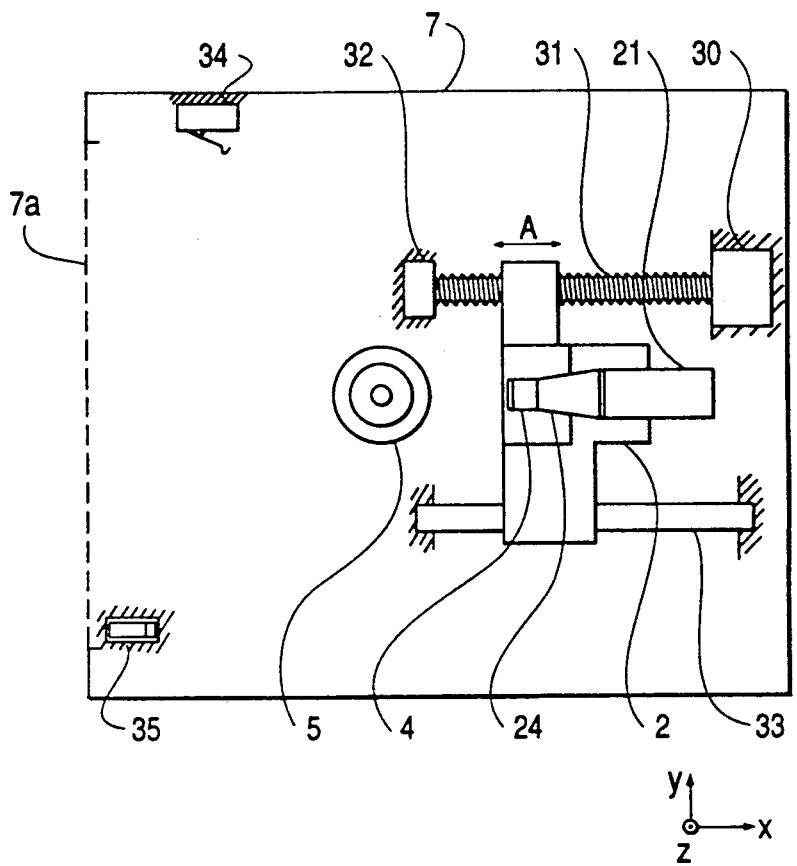
FIGS. 1 (a) and (b) are top views of a magneto-optical recording and/or reproducing apparatus according to a first embodiment of this invention.
Figure 1B:
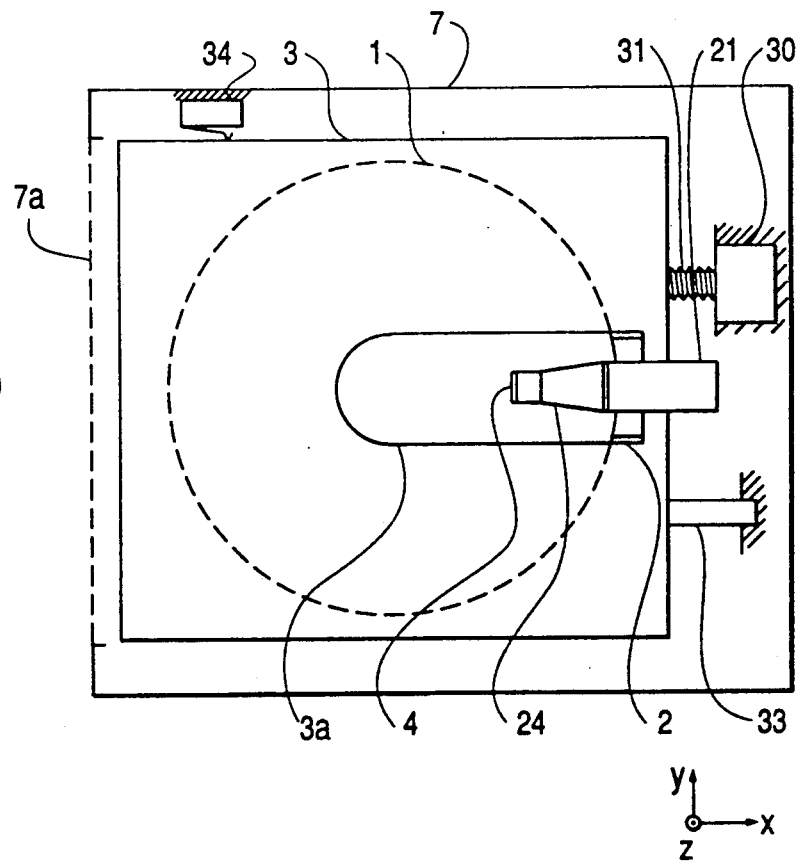
Figure 1C:
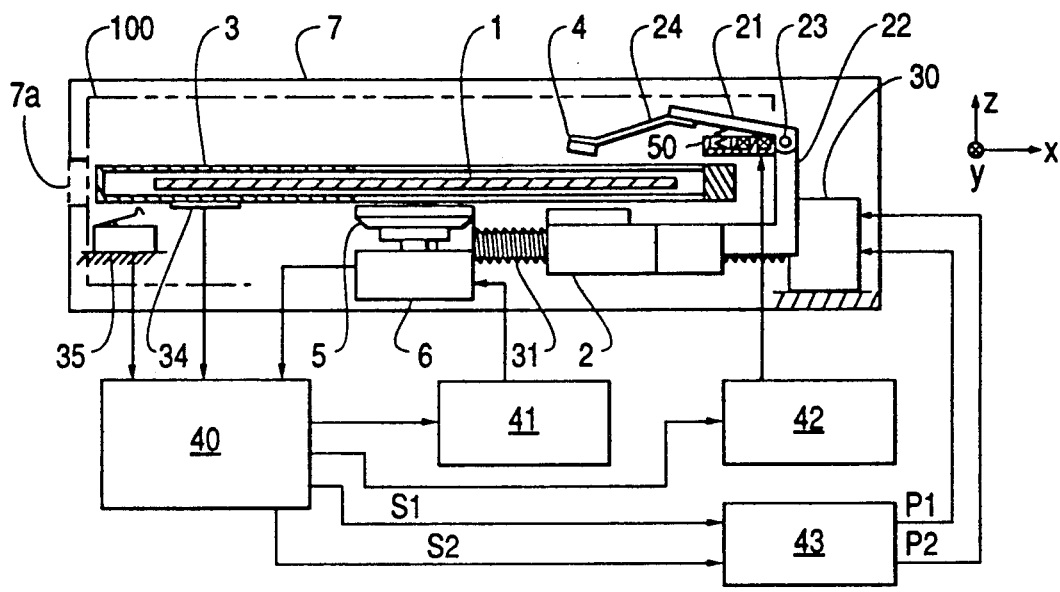
Figure 1D:
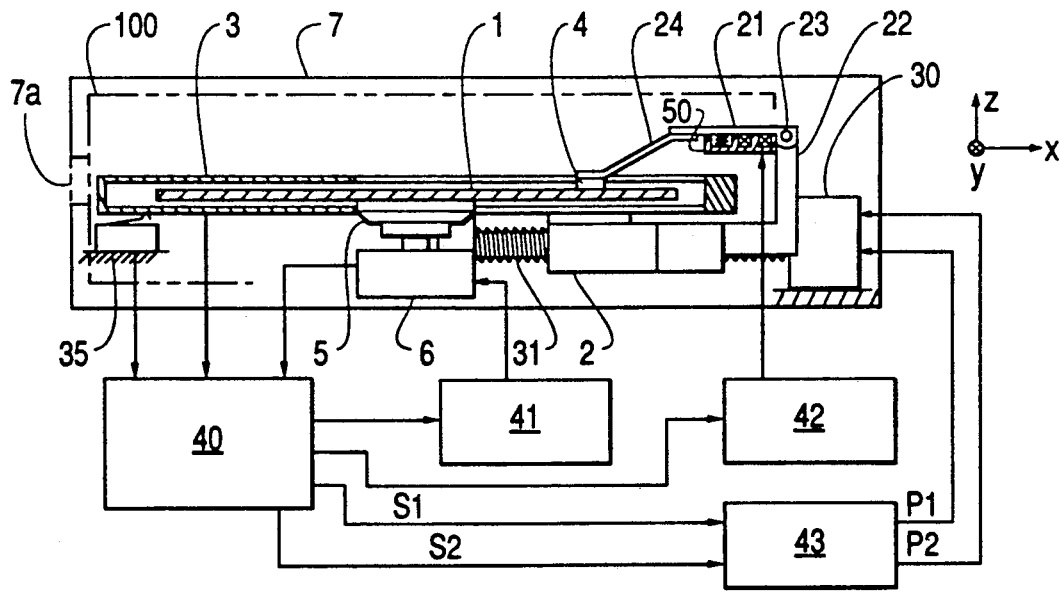

Description will be made below of a magneto-optical recording and/or reproducing apparatus according to a first embodiment of this invention while referring to the drawings.

FIGS. 1 (a) to (d) and FIGS. 2 (a) and (b) show a magneto-optical recording and/or reproducing apparatus according to this first embodiment. Of which, FIG. 1 (a) is a top view of the apparatus with a cartridge not inserted, FIG. (b) is a top view of the apparatus with a cartridge inserted, and FIGS. 1 (c) and (d) are side views of the apparatus of the first embodiment.

In FIGS. 1 (b) to (d), the reference numeral 1 indicates a magneto-optical disc having a spiral recording track. Information is recorded on the lower side of the magneto-optical disc 1 shown in FIG. 1 (c). In FIGS. 1 (a) to (d), the reference numeral 7 indicates a case for housing the entire body of the apparatus, 30 indicates a stepping motor fixedly mounted to the case 7, 31 indicates a screw axially rotatable by the stepping motor 30, 32 indicates a bearing fixed to the case 7 for freely rotatably supporting one end of the screw 31 about the axis thereof at the other end of which the stepping motor 30 is provided, and 33 indicates a guide shaft having each end fixed to the case 7 and disposed substantially parallel to the axis of the screw 31. However, the guide shaft 33 is not shown in FIGS. 1 (c) and (d).

The reference numeral 2 indicates an optical head in which an optical system for providing a convergent laser beam for the recording, reproducing or erasing of the magneto-optical disc 1 is contained. Also, the optical head 2 has a perforated hole through which the guide shaft 33 is freely slidably supported and a perforated thread portion for engaging with the thread portion of the screw 31. As the optical head 2 is freely slidable along the guide shaft 33, when the screw 31 is rotated to apply a thrust parallel to the guide shaft 33 to the perforated thread portion of the optical head 2, an access motion is carried out in the parallel direction to the guide shaft 33. The direction of this access motion is defined as the A-direction as shown in FIG. 1 (a).

Directions of the coordinate axes x, y and z are set as shown in FIGS. 1 (a) to (d). The direction of the x-axis is parallel to the A-direction and the rightward direction as shown in FIG. 1 (c) is made positive. The direction of the y-axis is perpendicular to the x-axis and parallel to the surface of the magneto-optical disc 1, and the upward direction as shown in FIG. 1 (a) is made positive. The direction of the z-axis is perpendicular to the surface of the magneto-optical disc 1 and the upward direction as shown in FIG. 1 (c) is made positive. For the sake of convenience, the positive direction and negative direction of the z-axis are respectively called upward direction and downward direction, and the positive direction and negative direction of the x-axis are respectively called backward direction and forward direction.

The reference numeral 4 indicates a magnetic head for providing a vertical magnetic field necessary for recording or erasing information to or from the magneto-optical disc 1. The magnetic head 4 is disposed at a position opposing to a convergent laser beam given by the optical head 2 to the magneto-optical disc 1 with the magneto-optical disc 1 therebetween. Also, the magnetic head 4 is formed in shape so that a lift in the positive direction of the z-axis can be generated by an air flow whose relative velocity is in the tangential direction of the recording track of the magneto-optical disc 1. The loadbeam 24 is a well-known loadbeam disclosed in, for example, Japanese Laid-Open Patent Application No. 1-92975, and connected to the magnetic head 4.

The reference numeral 21 indicates a first connecting member which is made of a soft magnetic material and whose one end is connected to the loadbeam 24, and 22 indicates a second connecting member whose one end is rigidly connected to the optical head 2. The first connecting member 21 and second connecting member 22 are coupled via a pin 23 with each other to form a link mechanism. That is, the first connecting member 21 is rotatable about the axis of the pin 23.

In addition, a magnetic yoke 50 is fixed to the second connecting member 23, which is shown in detail in FIG. 2. FIG. 2 (a) is a top view of the magnetic yoke 50 and FIG. 2 (b) a cross-sectional side view of the same. In FIG. 2, the magnetic yoke 50 is made of a soft magnetic material having cylindrical spaces for containing a coil 51 and a spring 52, and further, the cylindrical space for containing the coil 51 has a center pole 50a formed. The magnetic yoke 50, center pole 50a and coil 51 form an electromagnet and when the coil 51 is energized, a magnetic field is generated in the upward direction of the magnetic yoke 50 in FIG. 1 (c).

The magnetic head 4 is connected via the loadbeam 24, first connecting member 21 and second connecting member 22 to the optical head 2 and moves in the A-direction with the access motion of the optical head 2.

The reference numeral 5 indicates a turntable for mounting the magneto-optical disc 1 thereon and for providing a torque thereto. The turntable 5 is connected to a spindle motor 6 for generating a torque. The spindle motor 6 is fixed via its stator to the case 7, which is equipped with a sensor for detecting rotational speed. A cartridge 3 houses the magneto-optical disc 1, and has an access hole 3a perforated on each side thereof for inserting the optical head 2, magnetic head 4 and turntable 5 thereinto. The cartridge 3 is inserted by means of a cartridge transferring mechanism 100 which is well-known as disclosed in, for example, Japanese Laid-Open Patent Application No. 63-23,262 and then, lowered onto the turntable 5 for mounting. When being out of the magneto-optical recording and/or reproducing apparatus, the cartridge 3 has a member and a mechanism for closing the access hole 3a thereof. However, these are not shown here. Also, the case 7 has an insert opening 7a for inserting the cartridge 3 into the apparatus, which is provided on the left side of the apparatus shown in FIGS. 1 (a) to (d).

With respect to the logical state of signal lines, the states of high level and low level are respectively denoted by "H" and "L". A switch 34 detects the insertion of the cartridge 3 and a switch 35 detects the completion of mounting the magneto-optical disc 1 on the turntable 5. The output of the switch 34 becomes H when the cartridge 3 is inserted. Also, the output of the switch 35 becomes H when the magneto-optical disc 1 is mounted on the turntable 5. The output of the sensor built in the spindle motor 6 becomes H when the motor 6 is being rotated at a substantially predetermined speed and otherwise the output thereof becomes L.

The reference numeral 40 indicates a controller whose inputs are received from the switch 34, the switch 35 and the sensor of the spindle motor 6. Spindle motor drive circuit 41, magnetic coil drive circuit 42 and stepping motor drive circuit 43 drive the spindle motor 6, coil 51, and stepping motor 30, respectively. These circuits are controlled by outputs of the controller 40.

The spindle motor drive circuit 41 supplies a brake drive current to the spindle motor 6 for ceasing the same to rotate when the output thereof is L, and when it is H, the circuit 41 supplies a drive current to the spindle motor 6 for rotating the same at a pre-determined speed.

The magnetic coil drive circuit 42 cuts the current to the coil 51 when the output thereof is L, and when it is H, the circuit 42 supplies a current to the coil 51.

The stepping motor drive circuit 43 generates pulses $P_1$ and $P_2$ for driving the stepping motor 30 respectively in response to an input signal $S_1$ and an input signal $S_2$. When both of $S_1$ and $S_2$ are L, no pulse is generated, and when $S_1$ is H and $S_2$ is L, pulse $P_1$ is generated. When $S_1$ is L and $S_2$ is H, pulse $P_2$ is generated.

The stepping motor 30 serves to rotate the screw 31 in response to the pulses $P_1$ and $P_2$. When pulse $P_1$ is generated, the stepping motor 30 rotates the screw 31 by a predetermined rotational angle per one pulse to move the optical head 2 in the backward direction. When pulse $P_2$ is generated, the stepping motor 30 rotates the screw 31 by a predetermined rotational angle per one pulse to move the optical head 2 in the forward direction.

The controller 40 carries out an initialization just after the switch 34 became H, and the outputs to the spindle motor drive circuit 41 and magnetic coil drive circuit 42 and outputs $S_1$ and $S_2$ to the stepping motor 30 are all made L. Also, the controller 40 makes L the output to the spindle motor drive circuit 41 when both outputs from the switches 34 and 35 are H. In addition, the controller 40 makes H the output to the magnetic coil drive circuit 42 when the outputs from the switches 34 and 35 are both H as well as when the output from the spindle motor 6 is H, and outputs logic output signals $S_1$ and $S_2$ for driving the optical head 2 in a predetermined direction to the stepping motor drive circuit 43.

With the magneto-optical recording and/or reproducing apparatus as described above, the operation will be explained.

First, when the cartridge 3 is not inserted as shown in FIG. 1 (a), an output of the switch 34 and that of the switch 35 both become L. Next, when the cartridge 3 is inserted through the insert opening 7a as shown in FIGS. 1 (b) and (c), an output of the switch 34 becomes H and the controller 40 makes L outputs to the spindle motor drive circuit 41 and magnetic coil drive circuit 42 and outputs $S_1$ and $S_2$ to the stepping motor 30. As a result, the spindle motor drive circuit 41 supplies a brake drive current to the spindle motor 6, and the magnetic coil drive circuit 42 cuts the current to the coil 51. In this case, the first connecting member 21 is urged upward by the spring 52 to rotate about the axis of the pin 23. Then, the cartridge 3 moves in the direction to rest at a position where the rotation axis of the magneto-optical disc 1 and that of the turntable 5 are substantially aligned with each other. At this time, the magnetic head 4 is positioned in the upper area internally of the magneto-optical recording and/or reproducing apparatus due to the rotational movement of the loadbeam 24 and first connecting member 21 about the axis of the pin 23, thereby being evadable to be collided with the cartridge 3.

Next, as shown in FIG. 1 (d), the cartridge 3 is moved downward by the cartridge transferring mechanism 100 to mount the magneto-optical disc 1 contained thereinto on the turntable 5, and then the magneto-optical disc 1 rests at a position where it is not abutted against the inner wall of the cartridge 3. The optical head 2 is inserted into the access hole 3a to provide the state that a laser beam can be convergently applied to the surface of the magneto-optical disc 1.

In this case, an output of the switch 34 and that of the switch 35 both become H, so that the controller 40 makes H the output to the spindle motor drive circuit 41. As a result, the spindle motor drive circuit 41 supplies a start current to the spindle motor 6. Thus, the spindle motor 6 gives via the turntable 5 a torque about the z-axis to the magneto-optical disc 1 to thereby start the same to rotate.

When the spindle motor 6 rotates at a predetermined speed, the sensor built therein sends an output H to the controller 40. As all inputs to the controller 40 become H, it sends an output H to the magnetic coil drive circuit 42. The magnetic coil drive circuit 42 supplies a current to the coil 51 as its input becomes H. In this case, a magnetic flux flows into the magnetic circuit made of the periphery of the magnetic yoke 50 and the center pole 50a, so that a magnetic field can be generated in the upper area of the magnetic yoke 50 in FIG. 1 (d). As the first connecting member 21 is made of a soft magnetic material, the magnetic yoke 50 generates an attraction force for magnetically attracting the first connecting member 21. If the magnetic coil drive circuit 42 supplies the coil 51 with a current to generate an attraction force larger than the compression force of the spring 52, then the first connecting member 21 is attracted to the magnetic yoke 50 as shown in FIG. 1 (d).

As a result, the first connecting member 21 rotates counterclockwise about the axis of the pin 21 relative to the second connecting member 22 as shown in FIG. 1 (d), so that the magnetic head 4 and loadbeam 24 move downward to insert the magnetic head 4 into the access hole 3a of the cartridge 3, thus the magnetic head 4 approaching to the magneto-optical disc 1. In this case, the magneto-optical disc 1 is being rotated, so that an air layer at the neighborhood of the surface of the magneto-optical disc 1 is adhered to the surface thereof due to viscosity. As a result, an air flow will be formed whose relative velocity to the magnetic head 4 is in the tangential direction of a recording track of the magneto-optical disc 1. That is, when the magnetic head 4 approaches closely to the magnetooptical disc 1, a lift whose active direction is such as to be apart from the disc 1 will be applied to the magnetic head 4. On the other hand, the loadbeam 24 urges the magnetic head 4 in the direction to approach the same to the magneto-optical disc 1. As a result, the magnetic head 4 is to be positioned against the magneto-optical disc 1 at a position where the lift thus applied and the force thus urged are balanced with each other. Therefore, the magnetic head 4 can maintain an approach necessary to give a magnetic field for the recording or erasing of the magnetooptical disc 1 without coming into abutment thereagainst.

In recording information, the magnetic head 4 provides the magneto-optical disc 1 with a magnetic field modulated in response to the information to be recorded and at the same time, the optical head 2 provides the magneto-optical disc 1 with a convergent laser beam immodulated for effecting a thermomagnetic recording.

In erasing the recorded information, the magnetic head 4 provides the magneto-optical disc 1 with an immodulated magnetic field directed in the direction defined as an erasing direction and at the same time, the optical head 2 provides an immodulated convergent laser beam to the magneto-optical disc 1, thus the information is capable of erasing.

In order to change the recording position in the radial direction of the magneto-optical disc 1, the position of the optical head 2 is changed by controlling the output signals $S_1$ and $S_2$ to the stepping motor drive circuit 43 through the controller 40. That is, in order to move the optical head 2 peripherally of the magneto-optical disc 1, the output signals $S_1$ and $S_2$ are made H and L through the controller 40, respectively. As a result, a pulse is generated in the output signal $P_1$ of the stepping motor drive circuit 43, and the stepping motor 30 rotates the screw 31 in the direction to move the optical head 2 toward periphery of the magnetooptical disc 1. The optical head 2 is subjected to the application of a force to move it in the backward direction by the screw 31. Thus, the optical head 2 slidably moves on the guide shaft 33 in the backward direction. In order to move the optical head 2 toward the center of the magnetooptical disc 1, it can be achieved by making the input signals $S_1$ and $S_2$ to the circuit 43 to be L and H, respectively.

As the magnetic head 4 is connected via the loadbeam 24, first connecting member 21 and second connecting member 22 to the optical head 2, even when the optical head 2 is present at a certain point in the arrowed A-direction, the magnetic head 4 can always provide a magnetic field for the recording or erasing of a position where a convergent laser beam is to be radiated.

Figure 3B:
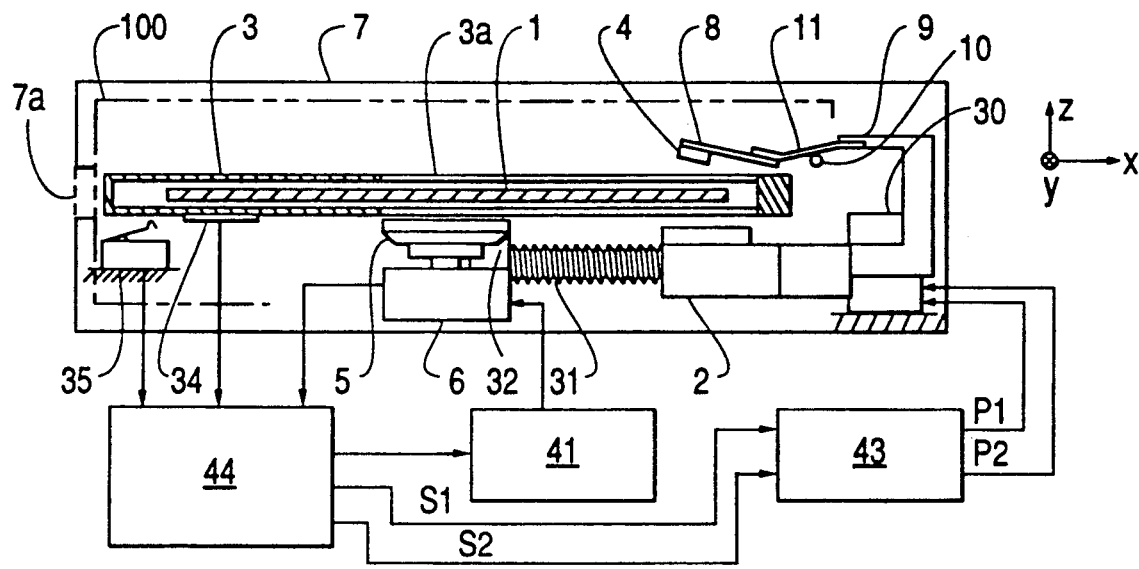
FIG. 3 (a) is a top view of a magneto-optical recording and/or reproducing apparatus according to a second embodiment of this invention.
Figure 3C:
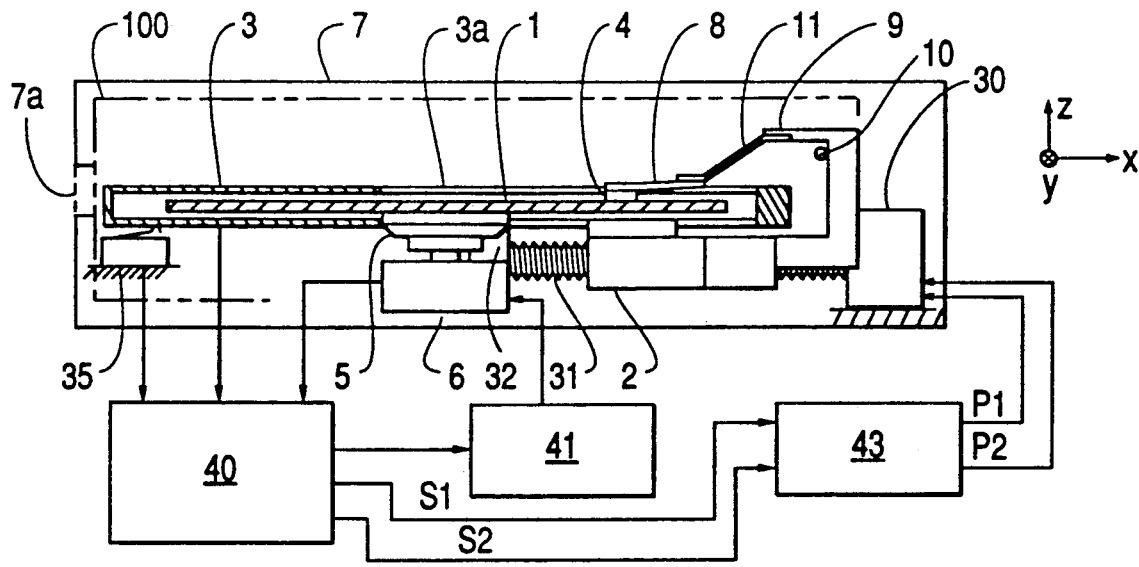

Next, a magneto-optical recording and/or reproducing apparatus according to a second embodiment of this invention will be described while referring to the drawings. FIGS. 3 (a) to (c) show a magneto-optical recording and/or reproducing apparatus according to the second embodiment of this invention. In which, FIG. 3 (a) is a top view and FIGS. 3 (b) and (c) are side views of the same. In these figures, the reference numeral 1 indicates a magneto-optical disc, 2 indicates an optical head, 3 indicates a cartridge, 4 indicates a magnetic head, 5 indicates a turntable, 6 indicates a spindle motor, 7 indicates a case, 30 indicates a stepping motor, 31 indicates a screw, 32 indicates a bearing, 33 indicates a guide shaft, 34 indicates a switch, 35 indicates a switch, 41 indicates a spindle motor drive circuit, and 43 indicates a stepping motor drive circuit. These members are of the same ones as in the first embodiment including the cartridge transfer mechanism 100 and its arrangement. Also, a loadbeam 8 is smaller in size than the loadbeam 24 shown in the first embodiment as shown, for example, in Reference 1, but is similar in functions thereto. In addition, the direction of each coordinate axis is identical to that of each axis in the first embodiment as shown in FIGS. 3 (a) to (c). The reference numeral 9 indicates a connecting member for maintaining a relative position between the optical head 2 and the magnetic head 4, which corresponds to an integrated member of the first and second connecting members 21 and 22 in the first embodiment. Also, the reference numeral 11 indicates an elastic body whose both ends are connected to the loadbeam 8 and the connecting member 9, respectively. The elastic body 11 elastically deforms to move the magnetic head 4 substantially in the z-axis direction. In addition, the elastic body 11 is at least larger in spring constant than the loadbeam 8, preferably tenfold larger. The reference numeral 10 indicates a cylindrical support rod. When the cartridge 3 is inserted, the support rod 10 abuts against the elastic body 11 to lift the magnetic head 4 upward thereby evading the magnetic head 4 from the cartridge 3. The support rod 10 is disposed parallel to the y-axis and abuts against the elastic body 11 when the optical head 2 is at a position more to the rear than the position corresponding to the outermost track of a recording area of the magneto-optical disc 1, and is fixed to the case 7 directly or via a mounting member.

The reference numeral 44 indicates a controller whose inputs are from the switch 34, the switch 35 and a sensor of the spindle motor 6. The spindle motor drive circuit 41 and stepping motor drive circuit 43 are controlled by outputs of the controller 40, respectively. The controller 44 carries out initialization just after the output of the switch 34 became H, and the output to the spindle motor drive circuit 41 becomes L, and the outputs $S_1$ and $S_2$ to the stepping motor drive circuit 43 respectively become H and L. Also, when the outputs of the switches 34 and 35 both become H, the controller 44 causes that the output to the spindle motor drive circuit 41 to become H and the outputs $S_1$ and $S_2$ to the stepping motor drive circuit 43 both become L. Furthermore, the controller 44 makes that when both the output of the switch 34 and that of the switch 35 are H and the output of the sensor of the spindle motor 6 is H, causes the outputs $S_1$ and $S_2$ to the stepping motor drive circuit 43 to become L and H, respectively.

With the magneto-optical recording and/or reproducing apparatus arranged as above, the operation will be explained below.

First, when the cartridge 3 is inserted through an insert opening 7a as shown in FIGS. 3 (a) and (b), an output of the switch 34 becomes H, and the controller 44 causes an output to the spindle motor drive circuit 41 to become L, and outputs $S_1$ and $S_2$ to the stepping motor drive circuit 31 respectively to become H and L. As a result, the spindle motor drive circuit 41 supplies a brake drive current to the spindle motor 6. Also, the stepping motor drive circuit 43 generates a pulse in the output $P_1$, and the stepping motor 30 rotates the screw 31 to move the optical head 2 in the backward direction, and thus the optical head 2 is at a position more to the rear than the position corresponding to the outermost track of a recording area of the magneto-optical disc 1. At this time, the support rod 10 is abutted against the elastic body 11 to deform the same elastically. As a result, the magnetic head 4 disposed via the loadbeam 8 on the front end thereof is positioned in the upper area internally of the magneto-optical recording and/or reproducing apparatus, thus evading the collision of the magnetic head 4 with the cartridge 3. Then, the cartridge 3 moves in the backward direction and rests at a position where the rotation axis of the disc 1 and that of the turntable 5 are substantially aligned with each other.

Next, as shown in FIG. 3 (c), the cartridge 3 is moved downward by means of a cartridge transfer mechanism 100 to mount the magneto-optical disc 1 onto the turntable 5, and the disc 1 rests at a position not to be abutted against the inner wall of the cartridge 3. The optical head 2 is inserted into an access hole 3a so that a convergent laser beam can be provided to the magneto-optical disc 1.

In this case, as outputs of the switches 34 and 35 both become H, an output from the controller 44 to the spindle motor drive circuit 41 becomes H. The spindle motor drive circuit 41, as its input becomes H, supplies a start current to the spindle motor 6. Then, the spindle motor 6 provides a torque about the z-axis to the magneto-optical disc 1 via the turntable 5 to thereby start the magneto-optical disc 1 to rotate.

If the spindle motor 6 rotates at a predetermined speed, an output from the sensor of the spindle motor 6 to the controller 44 becomes H. As all of inputs to the controller 44 become H, the outputs $S_1$ and $S_2$ to the stepping motor drive circuit 43 become L and H, respectively. As a result, the stepping motor drive circuit 44 generates a pulse into the output $P_2$, and the stepping motor 30 rotates the screw 31 to move the optical head 2 in the forward direction, so that the abutment of the support rod 10 against the elastic body 11 is disengaged to descend the magnetic head 4 toward the magneto-optical disc 1. The magnetic head 4 thus descended is rested facing the disc 1 at a position where a lift caused by the air flow generated by the rotation of the disc 1 and an urging force by the loadbeam 8 are balanced with each other. Operations of recording and erasing information are omitted here because these are similar to those in the first embodiment.

As the magnetic head 4 is connected via the elastic body 11 and connecting member 9 to the optical head 2, even when the optical head 2 is at a certain position of the arrowed A-direction, the magnetic head 4 can always provide a magnetic field for the recording or erasing of a position where a convergent laser beam is to be radiated. Also, as the elastic body 11 is as much as tenfold larger in spring constant than the loadbeam 8, after the magnetic head 4 has been descended toward the magneto-optical disc 1, the elastic body 11 substantially can be seen as a rigid body, which means that the lift and vibration characteristics of the magnetic head 4 in the second embodiment are never inferior to those in the first embodiment.

The effects of the second embodiment are similar to those of the first embodiment, however, the apparatus according to the second embodiment has the connecting member 9 unequipped with any mechanism. This means that maintainability of the accuracy of a relative position between the optical head 2 and the magnetic head 4 when the optical head 2 may be accelerated due to the access motion or a disturbance from the outside is higher in the second embodiment than in the first embodiment.

In addition, the apparatus of the second embodiment is not equipped with any mechanism in the movable member when the access motion is to be carried out and does not require the use of a member such as the magnetic yoke 50 in the first embodiment, so that the weight of the movable part can be reduced and the access time can be decreased. In addition, in the second embodiment, the magnetic head 4 can be lifted upward only by means of the support rod 10 to be abutted against the elastic body 11 without structurally using any mechanism additionally for providing an evading mechanism, largely contributing to a cost reduction.

Figure 4A:
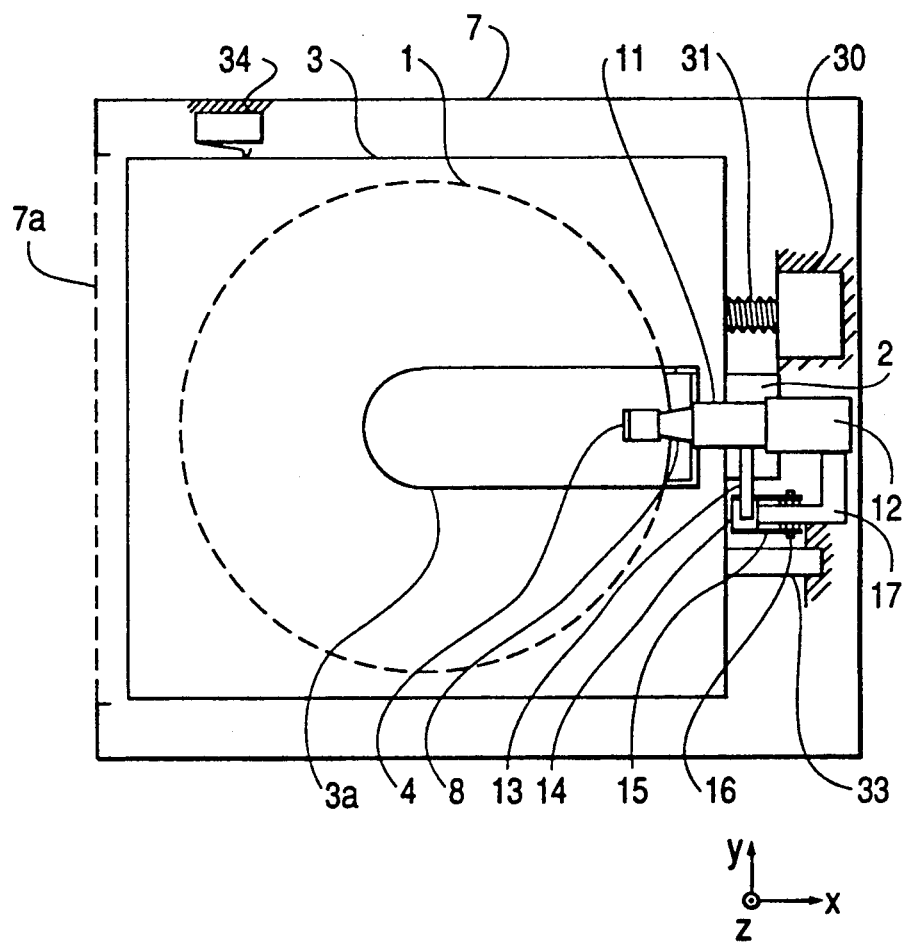
FIG. 4 (a) is a top view of a magneto-optical recording and/or reproducing apparatus according to a third embodiment of this invention.
Figure 4B:
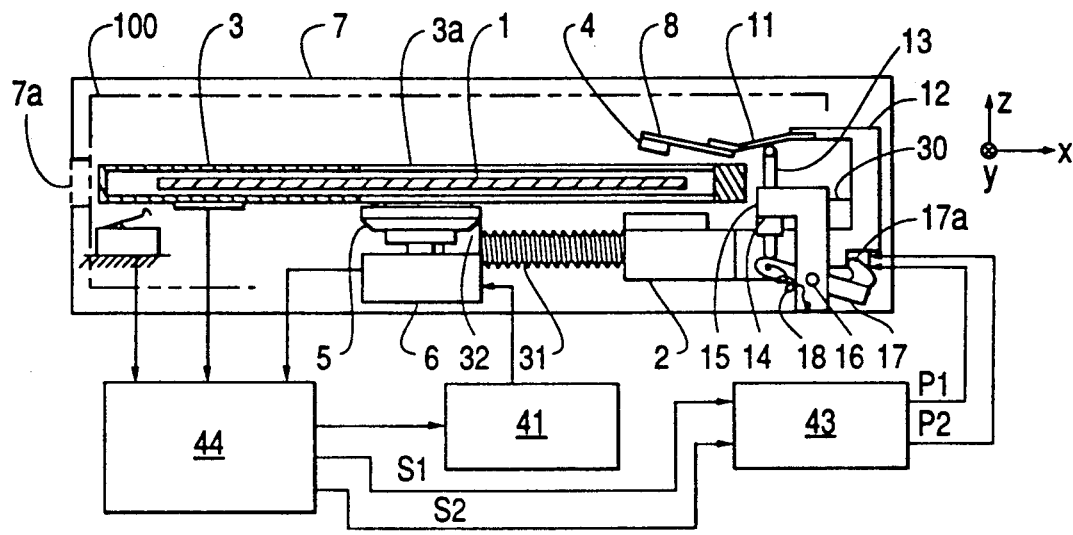
Figure 4C:
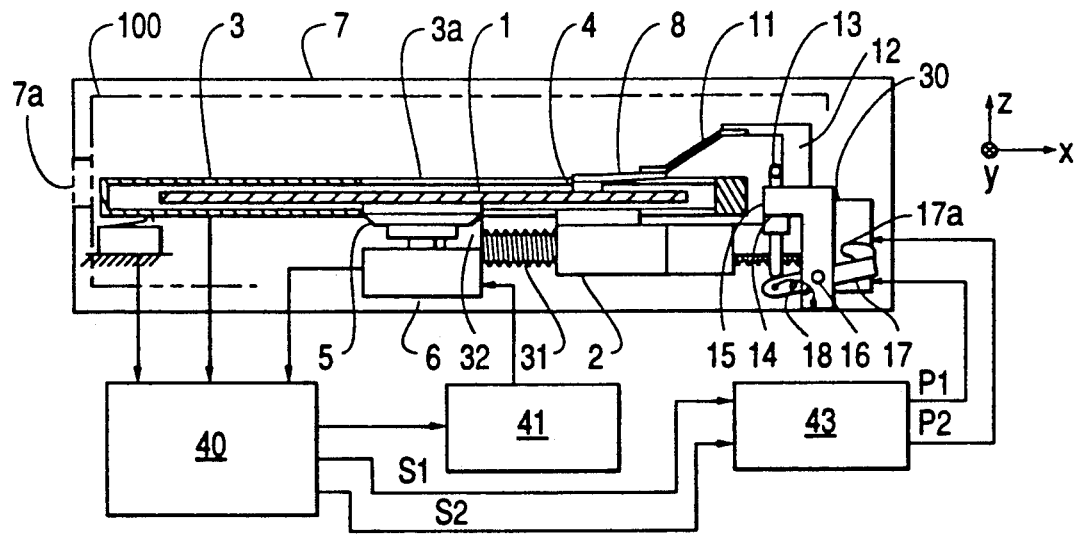

Hereinafter, description will be made on a magnetooptical recording and/or reproducing apparatus according a third embodiment of this invention by referring to the drawings. The magneto-optical recording and/or reproducing apparatus according to the third embodiment is shown in FIGS. 4 (a) to (c). In which, FIG. 4 (a) is a top view and FIGS. 4 (b) and (c) are side views of the apparatus. In these figures, the reference numeral 1 indicates a magnetooptical disc, 2 indicates an optical head, 3 indicates a cartridge, 4 indicates a magnetic head, 5 indicates a turntable, 6 indicates a spindle motor, 7 indicates a case, 8 indicates a loadbeam, 11 indicates an elastic body, 30 indicates a stepping motor, 31 indicates a screw, 32 indicates a bearing, 33 indicates a guide shaft, 34 indicates a switch, 35 indicates a switch, 41 indicates a spindle motor drive circuit, 43 indicates a stepping motor drive circuit and 44 indicates a controller. These members are of the same ones as in the second embodiment including a cartridge transfer mechanism 100 and its arrangement. The directions of coordinate axes, as shown in FIGS. 4 (a) to (c), are identical to those in the second embodiment. The reference numeral 12 indicates a connecting member for maintaining a relative position between the optical head 2 and the magnetic head 4, which serves to perform the same function as that of the connecting member 9 in the second embodiment. The reference numerals 13 to 18 respectively indicate members for forming a magnetic head moving means for elastically deforming the elastic body 11 by converting a deformation of the optical head 2 in the x-axis direction into a deformation in the y-axis direction. In which, 13 indicates an L-shaped rod made of a square part extending in the z-axis direction and a cylindrical part extending in the y-axis direction. The square part of the rod 13 is inserted into the rod holder 14 which is square in shape with a square hole perforated so as to be freely slidable in the z-axis direction. 17 indicates an L-shaped lever which is freely rotatable about the axis of the pin 16 of the y-axis direction. One end of the lever 17 is abutted against the lower end of the rod 13 and the other end thereof has a projection 17a which is abutted against the connecting member 12 at least when the optical head 2 has an access to a position more peripherally of the outermost track of its recording area. The lever holder 15 is fixed to the case 7 directly or via a fixing member and serves to maintain relative positions of the rod holder 14 and the pin 16 to the case 7, and thus the moving directions of the rod 13 and lever 17 are restricted via the rod holder 14 and pin 16. Also, a spring 18 is provided between the lever holder 15 and the lever 17, which serves to provide a counterclockwise rotational force to the lever 17 (not shown 3 (a)).

With the magneto-optical recording and/or reproducing apparatus as described above, the operation thereof will be explained below.

First, when the cartridge 3 is inserted through the insert opening 7a thereinto, an output from the switch 34 becomes H, and the controller 44 causes that an output to the spindle motor drive circuit 41 to become L and outputs $S_1$ and $S_2$ to the stepping motor drive circuit 30 to respectively become H and L. As a result, the spindle motor drive circuit 41 supplies a brake drive current to the spindle motor 6. Also, the stepping motor drive circuit 43 generates a pulse into its output $P_1$ so that the stepping motor 30 drives the screw 31 to rotate and the optical head 2 is moved in the backward direction to be rested at a position more to the rear than the position corresponding to the outermost track of a recording area of the magneto-optical disc 1. At this time, the connecting member 12 is abutted against the projection 17a of the lever 17 to urge the lever in the backward direction. As the lever 17 is freely rotatable about the axis of the pin 16, the movement of the connecting member 12 in the backward direction converts the motion of the lever 17 into a clockwise rotation about the axis of the pin 16 against the urging force developed by the spring 18. As a result, the abutting point of the rod 13 is moved upward for ascending the rod 13. The rod 13 is abutted against the elastic body 11. As a result, the elastic body 11 is elastically deformed, so that the magnetic head 4 disposed via the loadbeam 8 at the front end thereof can be positioned in the upper area internally of the magneto-optical recording and/or reproducing apparatus, thus evading the collision of the magnetic head 4 with the cartridge 3. Then, the cartridge 3 moves in the inserting direction and rests at a position where the rotation axis of the magneto-optical disc 1 and that of the turntable 5 are substantially aligned with each other.

Next, as shown in FIG. 4 (c), the cartridge 3 is moved downward to mount the magneto-optical disc 1 onto the turntable 5, and the disc rest at a position not to be abutted against the inner wall of the cartridge 3. The optical head 2 is inserted into an access hole 3a so that a convergent laser beam can be provided to the magneto-optical disc 1.

In this case, as outputs of the switch 34 and switch 35 both become H, an output from the controller 44 to the spindle motor drive circuit 41 becomes H. The spindle motor drive circuit 41, as its input becomes H, supplies a start current to the spindle motor 6. Then, the spindle motor 6 provides a torque about the z-axis to the magneto-optical disc 1 via the turntable 5 to thereby start the magnetooptical disc 1 to rotate.

If the spindle motor 6 rotates at a predetermined speed, an output from the sensor of the spindle motor 6 to the controller 44 becomes H. As all of inputs of the controller 44 become H, the outputs $S_1$ and $S_2$ to the stepping motor drive circuit 43 become L and H, respectively. As a result, the stepping motor drive circuit 43 generates a pulse into the output $P_2$, and the stepping motor 30 rotates the screw 31 to move the optical head 2 in the forward direction, so that the abutment of the projection 17a against the connecting member 12 can be disengaged to thereby rotate the lever 17 counterclockwise by the spring 18. As the lever 17 rotates counterclockwise, the rod 13 abutting against the front end thereof slidably descends through the rod holder 14 to thereby disengage the abutment against member 11. As a result, the magnetic head 4 is descended toward the magneto-optical disc 1 and rested facing the disc 1 at a position where the lift caused by the air flow generated by the rotation of the magnetooptical disc 1 and the urging force by the loadbeam 8 are balanced with each other. The operations of recording and erasing information are omitted here because there are the same as those in the first embodiment.

The effects of the third embodiment are similar to those of the second embodiment. However, in the third embodiment, there is no need to use a prolonged structural member such as the support rod 10 in the second embodiment, largely contributing to the compactness of the entire structure of an apparatus.

Furthermore, the scope of this invention is not to be limited to the above-mentioned embodiments and various modifications in structure are possible.

What is claimed is:

1. A magneto-optical recording and reproducing apparatus comprising:
   a means for moving a magneto-optical disc which is inserted into said apparatus to a predetermined mounting position on a turntable inside said apparatus;
   a means for rotating said turntable to rotate the magneto-optical disc in said predetermined mounting position;
   an optical head for providing a light spot for recording, reproducing and erasing of information to and from a magneto-optical disc in said predetermined mounting position;
   a magnetic head disposed at a position opposing said optical head with said magneto-optical disc therebetween for providing a magnetic field for recording and erasing of information, said magnetic head being lifted to maintain a substantially constant distance from said magneto-optical disc by a lift caused by an air flow generated by a rotation of said magneto-optical disc;
   a load means which has said magnetic head on one end thereof and which is elastically deformable for generating a force balanced with said lift;
   a deformation means connected to said load means; and
   a magnetic head moving means for deforming said deformation means so as to move said magnetic head away from said optical head in a direction substantially parallel to a rotation axis of said turntable until said magneto-optical disc is moved to said predetermined mounting position, thereby evading said magnetic head from said magneto-optical disc, and in a direction toward said magneto-optical disc after said magneto-optical disc has ben disposed at said predetermined mounting position.

2. An apparatus as claimed in claim 1, wherein said magnetooptical disc is contained in a cartridge.

3. An apparatus as claimed in claim 1, wherein said deformation means comprises an elastic material body having a larger spring constant than that of said load means.

4. An apparatus as claimed in claim 1, wherein said deformation means includes at least a link mechanism.

5. An apparatus as claimed in claim 1, wherein said magnetic head moving means deforms said deformation means by abutting the same against a structural member fixedly mounted on a case housing of the apparatus when said magnetic head is positioned further peripherally of a recording area of said magneto-optical disc.

6. An apparatus as claimed in claim 1, wherein said magnetic head moving means deforms said deformation means by applying a force caused by a movement of said optical head in a direction toward either a periphery or center of said magneto-optical disc.

* * * * *